United States Patent
Anderson et al.

(10) Patent No.: US 7,452,044 B1
(45) Date of Patent: Nov. 18, 2008

(54) METHOD AND APPARATUS FOR SELECTING INK EJECTION NOZZLES IN MULTI-CHIP PRINT HEADS

(75) Inventors: Frank Edward Anderson, Sadieville, KY (US); Elios Klemo, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/766,336

(22) Filed: Jun. 21, 2007

(51) Int. Cl.
B41J 29/38 (2006.01)

(52) U.S. Cl. .......................... 347/14; 347/17
(58) Field of Classification Search .............. 347/14, 347/17, 19
See application file for complete search history.

(56) References Cited

U.S. PATENT DOCUMENTS 5,946,007 A * 8/1999 Otsuka et al. ............... 347/23
6,310,636 B1 * 10/2001 Tajika et al. ................ 347/14

* cited by examiner

Primary Examiner—Thinh H Nguyen
(74) Attorney, Agent, or Firm—Luedeka, Neely & Graham, PC

(57) ABSTRACT

A method is described for controlling a micro-fluid ejection head that includes first and second heater chips disposed in a staggered overlapping arrangement, where a number of the nozzles of the first heater chip are substantially aligned with a corresponding number of the nozzles of the second heater chip in an overlapping region that includes N number of sub-regions. In one embodiment, the method includes: (a) determining a difference between the temperatures of the first and second heater chips; (b) determining a first percentage of nozzles in each sub-region of the first heater chip to be used in printing a first portion of the printed image; (c) determining a second percentage of nozzles in each sub-region of the second heater chip to be used in printing a second portion of the printed image; and (d) printing the first and second portions of the printed image using the first percentage of nozzles in each sub-region of the first heater chip and the second percentage of nozzles in each sub-region of the second heater chip. The first and second percentages of nozzles may be determined based on the difference in temperature between the first and second heater chips.

20 Claims, 4 Drawing Sheets

Detail A

METHOD AND APPARATUS FOR SELECTING INK EJECTION NOZZLES IN MULTI-CHIP PRINT HEADS

FIELD

This invention relates to the field of ink jet printers. More particularly, this invention relates to a system for minimizing print quality defects caused by temperature differences between adjacent heater chips in multi-chip micro-fluid ejection heads.

BACKGROUND

Significant effort has gone into the design of scalable micro-fluid ejection heads having staggered individual heater chips for use in wide-swath printing applications. In various wide-swath micro-fluid ejection heads designed to date, there is some amount of overlapping between two adjacent heater chips. The region in which two adjacent chips overlap is referred to as the "overlap region" or "stitching region." Due to the overlapping of the two adjacent chips, there are two nozzles (one in each adjacent chip) that could be used in printing a particular raster line. Thus, two nozzle firing possibilities exist for each bit of print data on the overlapped region.

In prior systems, various methods have been used to determine which of the two aligned nozzles will fire in the overlapped region. One method involves disabling all of the overlapped nozzles in one chip and using all of the overlapped nozzles in the adjacent chip to print the stitching region portion of the data. Another method involves randomly selecting nozzles from both chips in the stitching region. One of the problems with these approaches is that temperature variations between adjacent staggered chips are not taken into account.

While printing, different chips in a multi-chip array will reach different temperatures based on the density of the image data in the portion of the image that each chip is responsible for printing. Variations in temperature between chips introduce variations in ink drop sizes. The heater chips that operate at higher temperatures eject larger drop sizes. Since page-wide micro-fluid ejection heads are constructed by staggering multiple heater chips, one would expect temperature variations between adjacent chips. Due to differences in ink drop sizes, an abrupt transition in temperature between adjacent chips could create visually detectable defects in the printed image in the overlapping region. To avoid visually detectable defects in the printed image, there should be a gradual and smooth transition from larger size ink drops (ejected from a higher temperature chip) to smaller size ink drops (ejected from a lower temperature chip).

What is needed, therefore, is a system for selecting nozzles within the overlapping region to provide a smooth transition in the printed image when there are temperature differences between adjacent heater chips.

In another aspect of the design of multi-chip wide-swath micro-fluid ejection heads, the overlapped nozzles in one chip should be perfectly aligned with the overlapped nozzles in an adjacent chip. However, this is generally not the case due to the various tolerances in chip placement and nozzle misdirection. Thus, a technique is needed to provide better blending to reduce visual defects caused by the misalignment between the two chips in the overlapping region. Ideally, the system for selecting nozzles within the overlapping region would account for chip-to-chip nozzle misalignments as well as chip-to-chip temperature differences.

SUMMARY

To meet the above and other needs, the invention provides a method for controlling a micro-fluid ejection head that includes a first heater chip and a second heater chip. The first and second heater chips each have an array of nozzles from which ink is ejected in raster lines to form a printed image. The first and second heater chips are disposed in a staggered overlapping arrangement such that a number of the nozzles of the first heater chip are substantially aligned with a corresponding number of the nozzles of the second heater chip in an overlapping region. The overlapping region includes N number of sub-regions.

In one embodiment, the method includes the following steps: (a) determining a difference in temperature between a temperature of the first heater chip and a temperature of the second heater chip; (b) determining, based on the difference in temperature, a first number of nozzles in each sub-region of the first heater chip to be used in printing a first portion of the printed image; (c) determining, based on the difference in temperature, a second number of nozzles in each sub-region of the second heater chip to be used in printing a second portion of the printed image; and (d) printing at least the first and second portions of the printed image using the first number of nozzles in each sub-region of the first heater chip and the second number of nozzles in each sub-region of the second heater chip.

In some embodiments, the method includes determining the temperatures of the first and second heater chips based at least in part on the density of image data for a previous raster line of the printed image and the density of image data for a current raster line of the printed image.

In some embodiments, the method includes determining a first percentage of nozzles in each sub-region of the first heater chip to be used in printing a first portion of the printed image, and determining a second percentage of nozzles in each sub-region of the second heater chip to be used in printing a second portion of the printed image.

In another aspect, the invention provides an inkjet printer including a wide-swath micro-fluid ejection head. The micro-fluid ejection head includes a first heater chip having an array of nozzles from which ink is ejected in raster lines to form a first portion of a printed image, and a second heater chip having an array of nozzles from which ink is ejected in raster lines to form a second portion of the printed image. The second heater chip is disposed in relation to the first heater chip in a staggered overlapping arrangement such that a number of the nozzles of the first heater chip are substantially aligned with a corresponding number of the nozzles of the second heater chip in an overlapping region comprising N number of sub-regions. The printer includes means for determining a difference between the temperatures of the first and second heater chips, where the temperatures are determined based on the density of image data for a previous raster line as well as the density of image data for a current raster line. The printer also includes means for determining a first percentage of nozzles in each sub-region of the first heater chip to be used in printing a first portion of the image, and means for determining a second percentage of nozzles in each sub-region of the second heater chip to be used in printing a second portion of the image. In some embodiments, the first and second percentages are determined based on the difference in temperature. The printer includes means for selecting nozzles in each sub-region of the first and second heater chips to be used in printing the first and second portions of the image, where the nozzles are selected based on the first and second percentages.

In alternative embodiments, the means for determining the difference between the temperatures of the first and second heater chips, the means for determining the first percentage of nozzles, the means for determining the second percentage of nozzles, and the means for selecting nozzles in each sub-region of the first and second heater chips comprise one or more software modules executed on a host computer to which the printer is connected, such as a personal computer or other general computing device. Thus, the invention is not limited to any particular location of the processor or other means for making these determinations and selections.

Thus, various embodiments of the invention provide apparatuses and methods for addressing print quality defects cause by chip-to-chip temperature differences in adjacent overlapping heater chips in a wide-swath multi-chip array. In some embodiments, the invention also provides a technique for reducing the visibility of defects caused by misalignment between adjacent heater chips in a multi-chip array. The methods provided by the invention improve the visual appearance of a printed image by algorithmically providing more effective visual blending of ink dots in regions of the image where adjacent heater chips overlap. This improvement is provided without significantly affecting the amount of ink placed on the page and without the use of optical sensors.

In some embodiments of the invention, gradient curves are constructed based on image information, such as the dot density of the image to be printed and based on chip temperature modes. Thus, for every image line to be printed, the gradient curves are adjusted to minimize "stitching error" and provide optimized blending based on temperature differences between adjacent chips.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
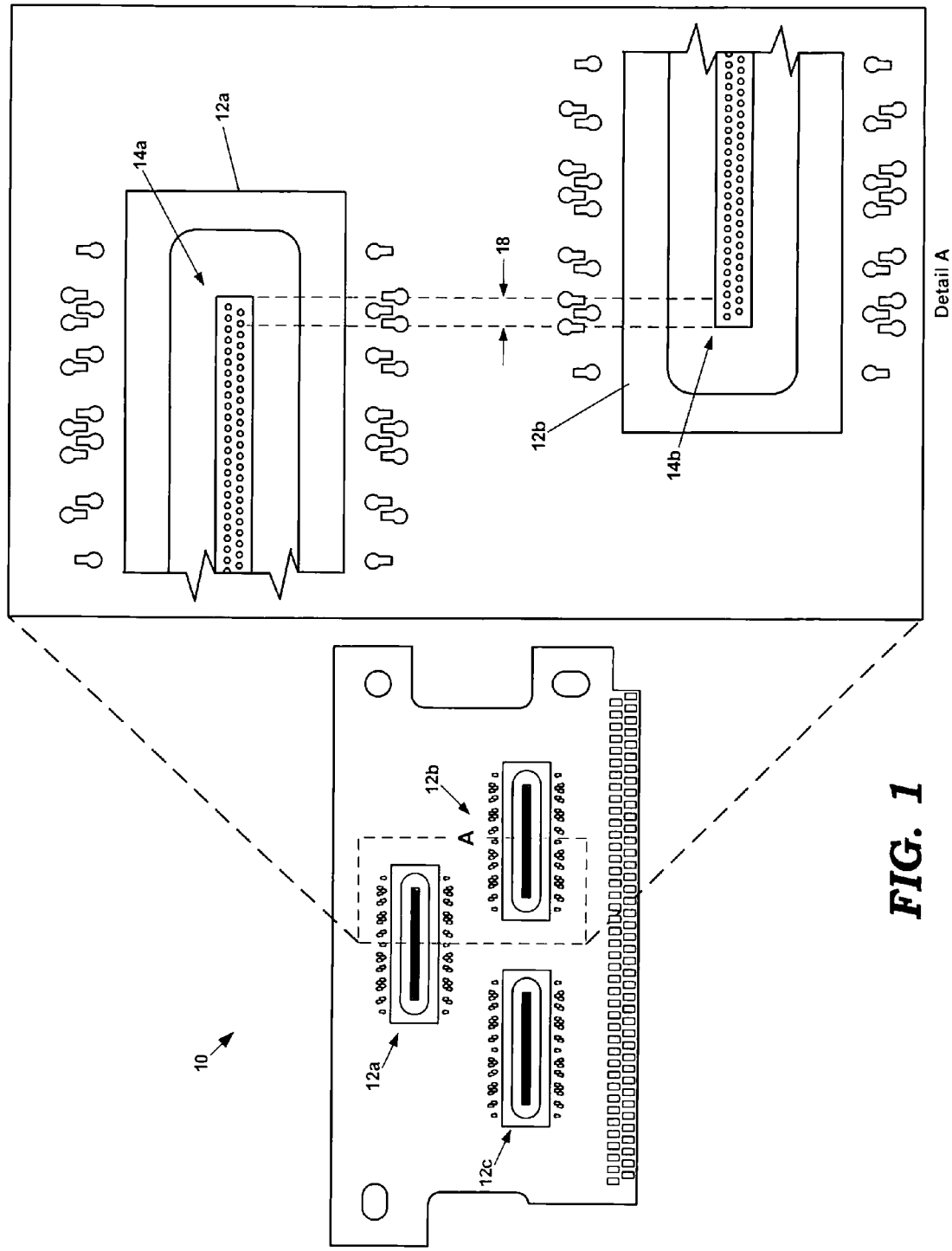
FIG. 1 depicts an example of a staggered multi-chip array in a wide-swath micro-fluid ejection head.

FIG. 1 depicts a wide-swath micro-fluid ejection head 10 of an inkjet printer, such as may be used to print the full width of a page. The micro-fluid ejection head 10 includes multiple heater chips 12a-12c that are disposed in a staggered arrangement wherein the ends of adjacent chips overlap each other. Each of the chips 12a-12c includes an array of nozzles 14a-14c through which droplets of ink are ejected when the ink is heated by heater elements within the chips. The heater elements are activated based on print signals generated by a print engine in the printer. Further relevant aspects of the print engine are discussed hereinafter.

Figure 2:
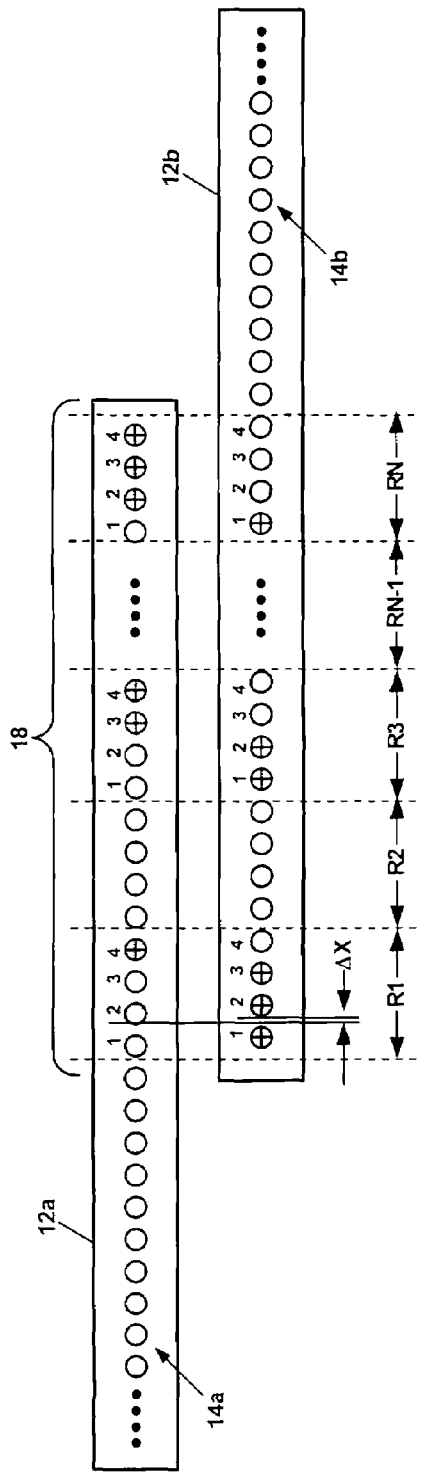
FIG. 2 depicts an overlapping region of two adjacent heater chips in a staggered multi-chip array.

As shown in FIG. 2, adjacent heater chips, such as chips 12a and 12b, overlap in an overlap region 18 of the micro-fluid ejection head. For purposes of describing the operation of the invention, the overlap region 18 is divided into N number of sub-regions designated as R1, R2, R3, RN-1 and RN. The overlap region 18 is also referred to herein as the stitching region. Within the overlap region 18 are some number of nozzles 14a in the chip 12a and some number of nozzles 14b in the chip 12b. The nozzles 14a and 14b within the overlap region 18 are also referred to herein as overlapped nozzles. The optimal number of overlapped nozzles 14a and 14b in the overlap region 18 is determined based on various design specifications. Generally, the higher the number of overlapped nozzles, the better the quality of ink dot blending in the printed image. For illustration purposes, each of the sub-regions R1, R2, R3, RN-1 and RN in the overlap region 18 may include eight nozzles (four in each chip portion within the sub-region). It will be appreciated that there may be any number of nozzles in each sub-region, and that the invention is not limited to any particular number or configuration of nozzles.

For each raster line of an image to be printed, chip 12a and chip 12b will attain operating temperatures T1 and T2, respectively. Generally, for each raster line of the image data to be printed, the temperatures T1 and T2 attained during the printing of the line are a function of the dot density of the previously printed line and the dot density of the current line. Thus, the chip temperatures T1 and T2 are proportional to the density of the portion of the image raster data that each chip 12a and 12b is responsible for printing. In some embodiments of the invention, the temperatures T1 and T2 can be estimated based on previous raster lines (just printed) image density information, current raster line (to be printed) image density information, and a temperature model that relates image density information to chip temperatures.

Figure 3:
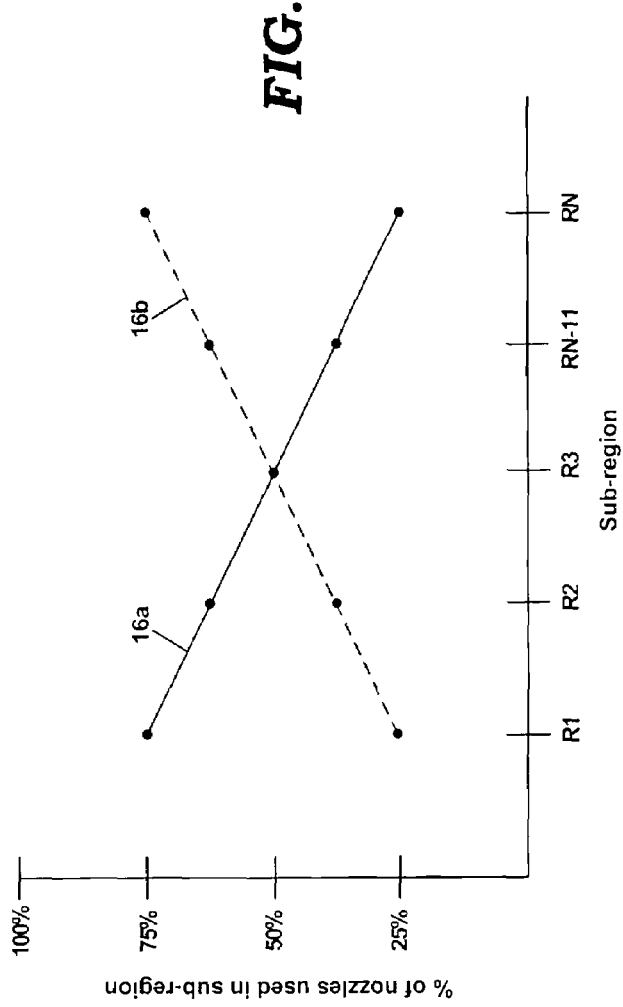
FIG. 3 depicts a gradient diagram for compensating for chip-to-chip temperature differences according to an embodiment of the invention.

In one exemplary situation, it is determined that the operating temperature T1 of the chip 12a will be higher than the operating temperature T2 of the chip 12b for a particular raster line of an image. For this raster line, T1>T2, and the temperature difference is $\Delta T = T1 - T2$. In this situation, ink droplets ejected from the nozzles 14a will be generally larger than ink droplets ejected from the nozzles 14b. Based on the value of $\Delta T$, a gradient constructor algorithm running on a processor of the printer or on a host device to which the printer is connected determines some first percentage P1 of the nozzles 14a and some second percentage P2 of the nozzles 14b within the overlapping region 18 that will be used in printing the current line. For purposes of illustration, the gradient constructor algorithm is represented in the curves 16a and 16b of the graph of FIG. 3. For example, the gradient constructor algorithm may determine that 75% of the nozzles in sub-region R1 of chip 12a will be used (curve 16a), and 25% of the nozzles in sub-region R1 of the chip 12b will be used (curve 16b). In sub-region R2, the gradient constructor algorithm may determine that 63% of the nozzles of chip 12a and 38% of the nozzles of chip 12b will be used. Somewhere in the middle of the overlapping region 18, such as in sub-region R3, both chips 12a and 12b will fire an equal number of nozzles (50%). In sub-region RN, the gradient constructor algorithm may determine that 25% of the nozzles of chip 12a and 75% of the nozzles of chip 12b will be used. This gradient function creates a gradual transition within the overlapping region 18 from the larger dots printed by chip 12a to the smaller dots printed by chip 12b. Since temperatures T1 and T2 of the chips 12a and 12b could change from raster line to raster line, the gradient constructor algorithm determines the gradient curve 16a and 16b on a line-to-line basis.

In the example depicted in FIG. 2, the gradient curves 16a and 16b are straight lines. However, this may not always be the case and the invention is not limited to linear gradients.

The gradient constructor algorithm may determine the nonlinear gradient curves provide the optimal blending characteristics in certain situations.

It should be noted that the slope of the gradient curves 16a and 16b will be a function of the temperature difference $\Delta T$ between chips 12a and 12b. Generally, as $\Delta T$ increases, the curves 16a and 16b will have a higher slope, and as $\Delta T$ decreases, the curves 16a and 16b will have a lower slope. In some embodiments of the invention, for $\Delta T$ of zero, the percentage of nozzles activated in each of the sub-regions R1, R2, R3, RN-1 and RN is equal to 50%. Also in some embodiments, for some maximum value of $\Delta T$, the gradient constructor algorithm would determine that 100% of the nozzles in the overlapping region 18 from one of the chips would be used and none of the nozzles from the other chip would be used.

Based on the percentages determined by the gradient constructor algorithm, the nozzles within each sub-region may be selected randomly or sequentially. For example, in sub-region R1, 75% (three) of the four nozzles of chip 12a and 25% (one) of the four nozzles of chip 12b are used. In a first method, the three nozzles from chip 12a are randomly selected (such as nozzles 1, 2 and 4), and the one remaining nozzle from chip 12b is selected (nozzle 3). In a second method, the three nozzles from chip 12a are selected sequentially (such as nozzles 1, 2 and 3), and the one remaining nozzle from chip 12b is selected (nozzle 4). This method is illustrated in FIG. 2, where the nozzles having a "+" in the center represent nozzles that are not used. The nozzle selection method used may be determined based on various factors, including image characteristics, optimal image performance for the particular micro-fluid ejection head and chip configuration, and temperature characteristics.

The determination of the gradient curves is but one step in a method of constructing image data for a printing operation.

the density of the image raster data for the previous raster lines as well as the density of the image raster data for the current line. The output of the thermal model (step 30) is a chip temperature table, such as represented in Table I below. In some embodiments, the calculation of expected temperatures of the heater chips 12a-12c based on the thermal model is performed by a processor associated with the print job source 44 rather than by the processor 42 of the printer 40.

TABLE 1

| Raster Line No.: | Temperature of chip 12a: | Temperature of chip 12b: | Temperature of chip 12c: |
|---|---|---|---|
| 1 | $T1_1$ | $T2_1$ | $T3_1$ |
| 2 | $T1_2$ | $T2_2$ | $T3_2$ |
| 3 | $T1_3$ | $T2_3$ | $T3_3$ |
| $N_{RL}$ | $T1_N$ | $T2_N$ | $T3_N$ |

Based on the chip temperature table, the processor 42 executes a gradient constructor algorithm to determine, for each raster line ($1, 2, 3 \ldots N_{RL}$), the percentages of nozzles to be activated in each sub-region (R1, R2 ... RN) of each overlapping region of each heater chip (step 32). The output of the gradient constructor (step 32) is a gradient table such as represented in Table II, where the % symbols represent percentage values determined by the gradient constructor algorithm. In some embodiments, the gradient constructor algorithm is executed on a processor associated with the print job source 44.

TABLE II

| Raster Line No.: | Overlapping region - chips 12a-12b | | | | | | Overlapping region - chips 12b-12c | | | | | | Overlapping region - chips 12c-12d | | | | | |
| | R1 | | R2 | | RN | | R1 | | R2 | | RN | | R1 | | R2 | | RN | |
| | 12a | 12b | 12a | 12b | 12a | 12b | 12b | 12c | 12b | 12c | 12b | 12c | 12c | 12d | 12c | 12d | 12c | 12d |
| 1 | % | % | % | % | % | % | % | % | % | % | % | % | % | % | % | % | % | % |
| 2 | % | % | % | % | % | % | % | % | % | % | % | % | % | % | % | % | % | % |
| 3 | % | % | % | % | % | % | % | % | % | % | % | % | % | % | % | % | % | % |
| $N_{RL}$ | % | % | % | % | % | % | % | % | % | % | % | % | % | % | % | % | % | % |

Figure 4:
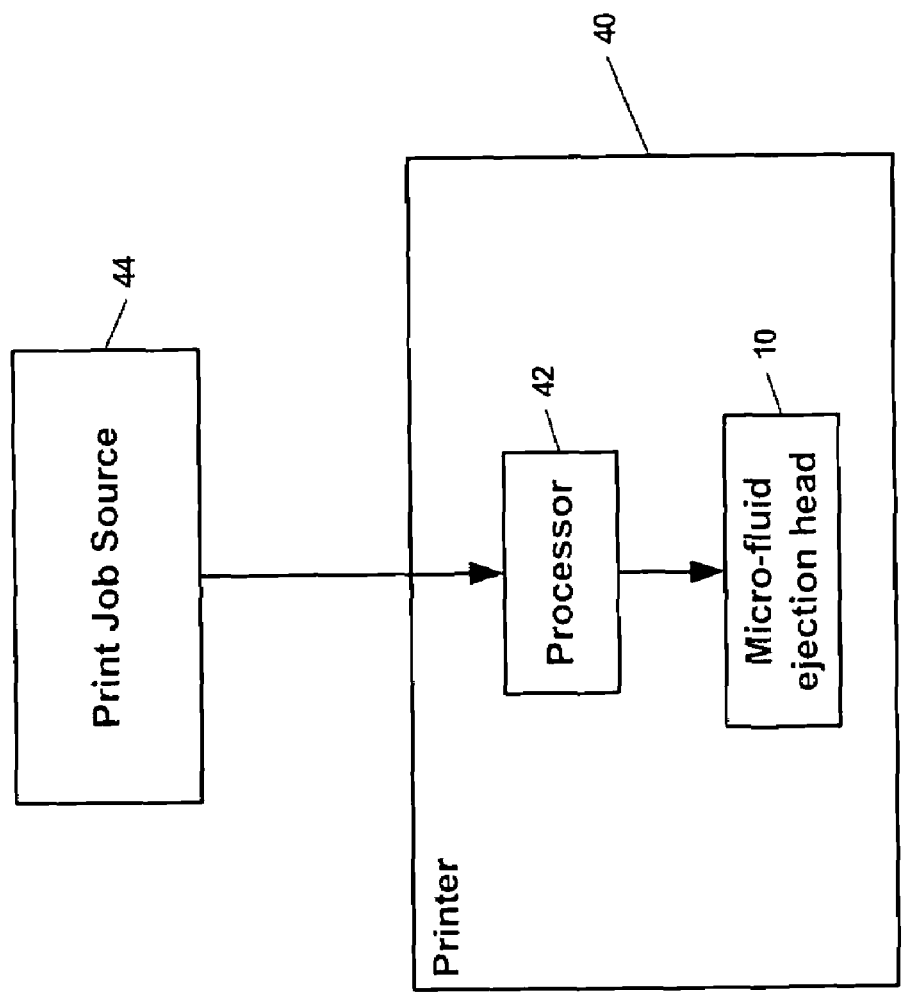
FIG. 4 depicts a functional block diagram of an inkjet printer system.
Figure 5:
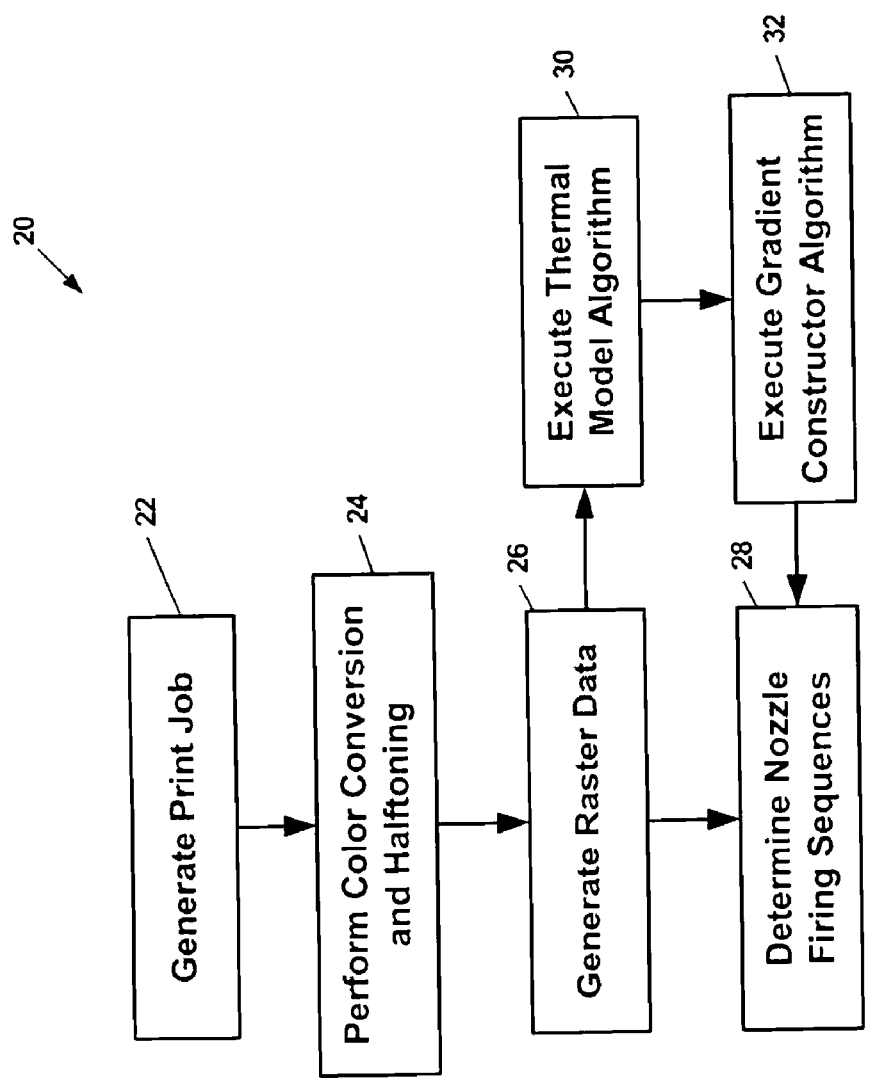
FIG. 5 depicts a functional flow diagram of an inkjet printing process according to an embodiment of the invention.

As shown in FIGS. 4 and 5, which depict an inkjet printer system and a printing process according to an embodiment of the invention, a print job source 44, such as a personal computer or other host device, executes a software application that generates a print job (step 22). The print job is sent to the printer 40 where a processor 42 performs color conversion and half-toning (step 24) and generates raster data based on the print job (step 26). Alternatively, a processor associated with the print job source 44 may perform the color conversion and half-toning (step 24) and generate the raster data based on the print job (step 26) so that these tasks need not be performed in the printer 40. Based on the raster data and a first-order thermal model of the print head 10, the processor 42 calculates the expected temperature of each of the heater chips 12a-12c for each raster line ($1, 2, 3 \ldots N_{RL}$) (step 30). In some embodiments, the thermal model takes into account Based on the gradient table (from step 32) and the raster data (from step 26), the print engine running on the processor 42 determines the nozzle firing sequences for each image line to be printed (step 28). For each raster line to be printed, the print engine looks at the appropriate row in the gradient table (corresponding to the number of the raster line) and selects the nozzles to fire from each chip within each sub-region of each overlapping region.

In the example provided above, it is assumed that the gradient curves are determined "on the fly" as the printer is printing. In an alternative embodiment, the gradient curves are calculated prior to printing the job, where the calculation of the gradient curves is based on the content of the image to be printed.

Another benefit provided by the present invention is more efficient blending of adjacent nozzles in the overlapping regions to hide the effects of possible misalignment between the adjacent nozzles. As shown in FIG. 2, there may be an offset Δx between two adjacent nozzles in the overlapping region. This offset may be due to chip placement tolerances combined with nozzle placement tolerances. The improved blending provided by the gradient constructor algorithms described herein may also lessen the visual impact of print defects caused by such misalignment tolerances.

The foregoing description of embodiments of this invention has been presented for purposes of illustration and description. The embodiments described are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for controlling a micro-fluid ejection head comprising at least a first heater chip and a second heater chip, each having an array of nozzles from which ink is ejected in raster lines to form a printed image, where the first and second heater chips are disposed in a staggered overlapping arrangement such that a number of the nozzles of the first heater chip are substantially aligned with a corresponding number of the nozzles of the second heater chip in an overlapping region comprising N number of sub-regions, the method comprising:
    (a) determining a difference in temperature between a temperature of the first heater chip and a temperature of the second heater chip;
    (b) based at least in part on the difference in temperature, determining a first number of nozzles in each sub-region of the first heater chip to be used in printing a first portion of the printed image;
    (c) based at least in part on the difference in temperature, determining a second number of nozzles in each sub-region of the second heater chip to be used in printing a second portion of the printed image; and
    (d) printing at least the first and second portions of the printed image using the first number of nozzles in each sub-region of the first heater chip and the second number of nozzles in each sub-region of the second heater chip.

2. The method of claim 1 wherein step (a) comprises determining a difference in temperature for each raster line of the printed image.

3. The method of claim 2 wherein step (a) comprises calculating the difference in temperature based at least in part on a density of image data for a previous raster line of the printed image and a density of image data for a current raster line of the printed image.

4. The method of claim 1 wherein step (a) comprises determining a chip temperature table having entries for temperatures of the first and second heater chips for each raster line of the printed image.

5. The method of claim 1 wherein:
    step (b) comprises determining a first percentage of the nozzles in each sub-region that are to be used in printing the first portion the printed image; and
    step (c) comprises determining a second percentage of the nozzles in each sub-region that are to be used in printing the second portion the printed image.

6. The method of claim 5 wherein:
    step (a) comprises determining that the temperature of the first heater chip is greater than the temperature of the second heater chip;
    step (b) comprises determining the first percentage to be greater than the second percentage in a first sub-region of the overlapping region; and
    step (b) comprises determining the first percentage to be less than the second percentage in an Nth sub-region of the overlapping region.

7. The method of claim 6 wherein step (b) comprises determining the first percentage to be equal to the second percentage in a sub-region disposed between the first sub-region and the Nth sub-region.

8. The method of claim 5 wherein steps (b) and (c) comprise generating a gradient table having table entries for the first percentage and second percentage in each sub-region and each raster line of the printed image.

9. The method of claim 1 wherein
    step (b) includes selecting particular nozzles in each sub-region of the first heater chip to be used in printing the first portion of the printed image; and
    step (c) includes selecting particular nozzles in each sub-region of the second heater chip to be used in printing the second portion of the printed image.

10. The method of claim 9 wherein the particular nozzles of each sub-region of the first heater chip selected to be used in printing the first portion of the printed image are not aligned with the particular nozzles of each sub-region of the second heater chip selected to be used in printing the second portion of the printed image.

11. A method for controlling a micro-fluid ejection head comprising at least a first heater chip and a second heater chip, each having an array of nozzles from which ink is ejected in raster lines to form a printed image, where the first and second heater chips are disposed in a staggered overlapping arrangement such that a number of the nozzles of the first heater chip are substantially aligned with a corresponding number of the nozzles of the second heater chip in an overlapping region comprising N number of sub-regions, the method comprising:
    (a) determining a difference in temperature between a temperature of the first heater chip and a temperature of the second heater chip, where the temperatures of the first and second heater chips are determined based at least in part on density of image data for a previous raster line of the printed image and density of image data for a current raster line of the printed image;
    (b) based on the difference in temperature, determining a first percentage of nozzles in each sub-region of the first heater chip to be used in printing a first portion of the printed image;
    (c) based at least in part on the difference in temperature, determining a second percentage of nozzles in each sub-region of the second heater chip to be used in printing a second portion of the printed image;
    (d) based at least in part on the first percentage, selecting particular nozzles in each sub-region of the first heater chip to be used in printing the first portion of the printed image;
    (e) based at least in part on the second percentage, selecting particular nozzles in each sub-region of the second heater chip to be used in printing the second portion of the printed image, where the second nozzle of the second heater chip are not aligned with the selected nozzles of the first heater chip; and (f) printing at least the first and second portions of the printed image using the selected nozzles of the first heater chip and the selected nozzles of the second heater chip.

12. An inkjet printer for receiving print data from a host computer and for generating a printed image based on the print data, the inkjet printer comprising:
  a wide-swath micro-fluid ejection head comprising:
    a first heater chip having an array of nozzles from which ink is ejected in raster lines to form a first portion of the printed image; and
    a second heater chip having an array of nozzles from which ink is ejected in raster lines to form a second portion of the printed image, the second heater chip disposed in relation to the first heater chip in a staggered overlapping arrangement such that a number of the nozzles of the first heater chip are substantially aligned with a corresponding number of the nozzles of the second heater chip in an overlapping region comprising N number of sub-regions;
  means for determining a difference in temperature between a temperature of the first heater chip and a temperature of the second heater chip, wherein the temperatures of the first and second heater chips are determined based at least in part on density of image data for a previous raster line of the printed image and density of image data for a current raster line of the printed image;
  means for determining a first percentage of nozzles in each sub-region of the first heater chip to be used in printing a first portion of the printed image, where the first percentage is determined based at least in part on the difference in temperature;
  means for determining a second percentage of nozzles in each sub-region of the second heater chip to be used in printing a second portion of the printed image, where the second percentage is determined based at least in part on the difference in temperature;
  means for selecting nozzles in each sub-region of the first heater chip to be used in printing the first portion of the printed image, where the nozzles are selected based at least in part on the first percentage; and
  means for selecting nozzles in each sub-region of the second heater chip to be used in printing the second portion of the printed image, where the selected nozzles of the second heater chip are not aligned with the second nozzles of the first heater chip, and where the nozzles are selected based at least in part on the second percentage.

13. The inkjet printer of claim 12 wherein the means for determining a difference in temperature between a temperature of the first heater chip and a temperature of the second heater chip comprises a processor associated with the inkjet printer, the processor for executing a thermal model algorithm to calculate the temperatures of the first and second heater chips for each raster line of the printed image, where the thermal model bases the calculation at least in part on the density of image data for the previous raster line and the density of image data for the current raster line of the printed image.

14. The inkjet printer of claim 12 wherein the means for determining a difference in temperature between a temperature of the first heater chip and a temperature of the second heater chip comprises a processor associated with the host computer, the processor for executing a thermal model algorithm to calculate the temperatures of the first and second heater chips for each raster line of the printed image, where the thermal model bases the calculation at least in part on the density of image data for the previous raster line and the density of image data for the current raster line of the printed image.

15. The inkjet printer of claim 12 wherein the means for determining a first percentage of nozzles and the means for determining a second percentage of nozzles comprise a processor associated with the inkjet printer, the processor for executing a gradient constructor algorithm to calculate the first and second percentages based at least in part on the difference in temperature between the temperature of the first heater chip and the temperature of the second heater chip.

16. The inkjet printer of claim 12 wherein the means for determining a first percentage of nozzles and the means for determining a second percentage of nozzles comprise a processor associated with the host computer, the processor for executing a gradient constructor algorithm to calculate the first and second percentages based at least in part on the difference in temperature between the temperature of the first heater chip and the temperature of the second heater chip.

17. The inkjet printer of claim 12 wherein the means for selecting nozzles in each sub-region of the first and second heater chips comprises a processor associated with the inkjet printer, the processor for executing a print engine for selecting the nozzles based at least in part on the first and second percentages.

18. The inkjet printer of claim 12 wherein the means for selecting nozzles in each sub-region of the first and second heater chips comprises a processor associated with the host computer, the processor for executing a print engine for selecting the nozzles based at least in part on the first and second percentages.

19. A method for controlling a micro-fluid ejection head comprising at least a first heater chip and a second heater chip, each having an array of nozzles from which ink is ejected in raster lines to form a printed image, where the first and second heater chips are disposed in a staggered overlapping arrangement such that a number of the nozzles of the first heater chip are substantially aligned with a corresponding number of the nozzles of the second heater chip in an overlapping region, the method comprising:
  (a) determining a difference in temperature between a temperature of the first heater chip and a temperature of the second heater chip;
  (b) based at least in part on the difference in temperature, determining a first number of nozzles of the first heater chip to be used in a print operation;
  (c) based at least in part on the difference in temperature, determining a second number of nozzles in of the second heater chip to be used in the print operation; and
  (d) performing the print operation using the first number of nozzles the first heater chip and the second number of nozzles of the second heater chip.

20. The method of claim 19, wherein the first number of nozzles of the first heater chip is different from the second number of nozzles of the second heater chip.

* * * * *